Patented Sept. 5, 1922.

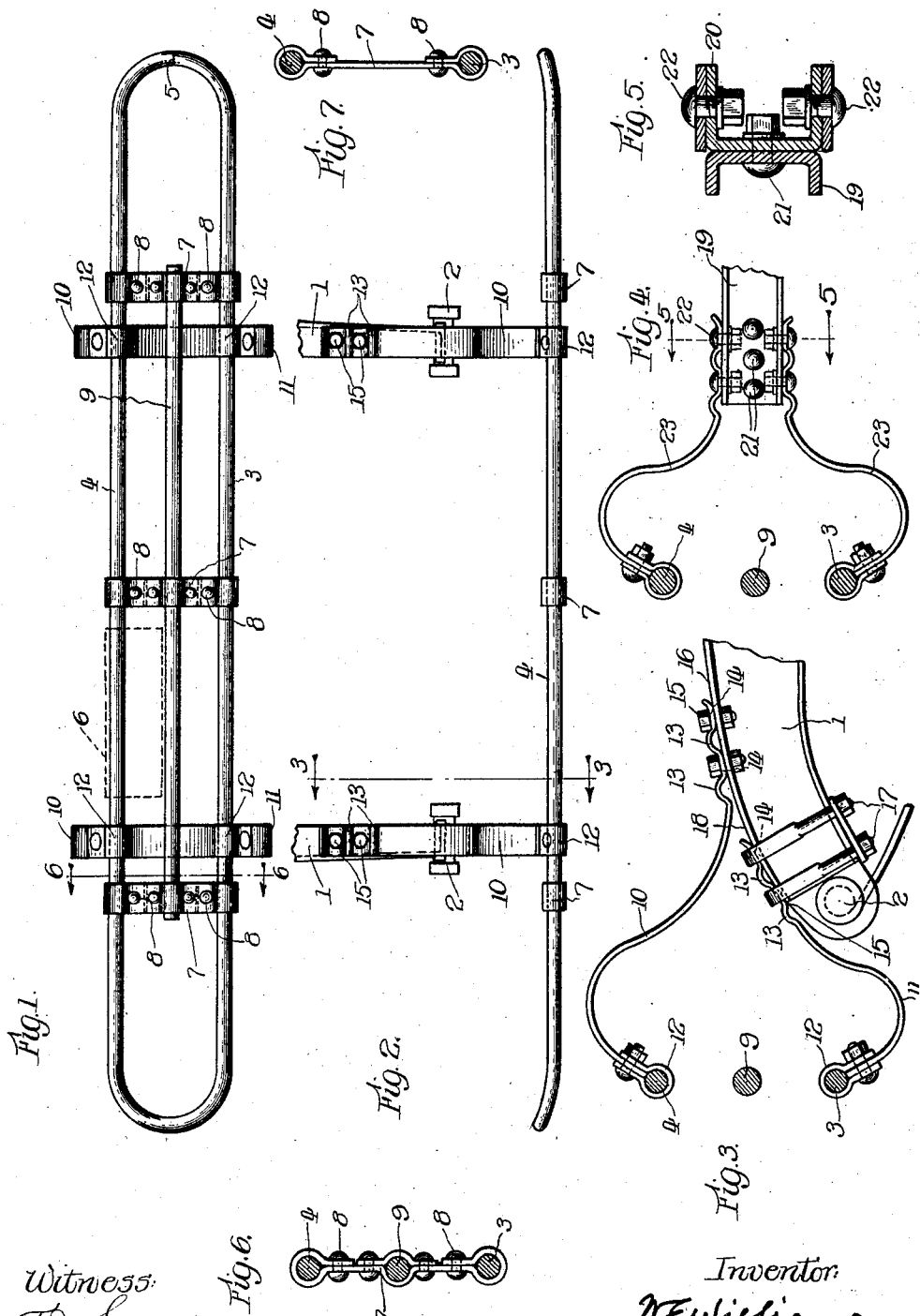

1,427,928

UNITED STATES PATENT OFFICE.

WILLIAM ERASTUS WILLIAMS, OF WILMETTE, ILLINOIS.

AUTOMOBILE BUMPER.

Application filed October 3, 1921. Serial No. 504,841.

*To all whom it may concern:*

Be it known that I, WILLIAM ERASTUS WILLIAMS, a citizen of the United States, a resident of the village of Wilmette, county of Cook, and State of Illinois, have invented a new and useful Improvement in Automobile Bumpers, of which the following is a specification.

My bumper relates to that class of devices which are put upon the front and oftentimes the rear of automobiles to avoid injury by collision, and the object of the invention is to provide a very cheap, efficient bumper that may be adjusted to a wide range of cars without special fittings.

Reference will be had to the accompanying drawings in which Figure 1 is a front elevation of the bumper.

Figure 2 is a top plan view.

Figure 3 is a section on the line 3—3, Fig. 1 of the bumper as applied to the front end of a car or automobile.

Figure 4 is a view analogous to Fig. 3, showing a slight modification.

Figure 5 is a section on line 5—5 of Figure 4.

Figure 6 is a section on line 6—6 of Figure 1.

Figure 7 is a transverse sectional view of the bumper beams showing a modification which involves the absence of a middle rod for the bumper beam members.

In the drawing 1 indicates the front ends of the members of the automobile or car frame, and 2 a shackle bolt as ordinarily used in connection with automobile frames and spring connections. Automobile bumpers heretofore have been made in various ways involving the bumper beam in a variety of shapes and forms, but the preponderance of practice has been to make a single beam in various forms of cross section, round, square flat, and with various modifications of the arrangement of those bars.

I prefer to make my bumper, or the part of the bumper that is actually involved in collision, out of a round rod, shown in the drawings as solid, but tubular rods may be used instead. I prefer the solid rod because I may get a stronger beam with less diameter than with a tubular rod. This bumper beam I prefer to make in a loop having a top and bottom member, as indicated in the drawing, wherein 3 indicates the bottom member of the loop and 4 the top member. I prefer to have this member in a continuous piece, although it may be in special pieces, or one piece with a cold shut end. I have shown the member made of one piece welded or brazed together at the joint indicated by 5 at the right end of the loop, in Figures 1 and 2.

The bottom and top bars of the loop, 3 and 4, are separated from each other a wider distance than has heretofore been the practice generally, in making this type of a bumper, the purpose being to make the bumper wide enough to register surely in collision with other narrower bumpers and with parts of the car that may be first encountered in collision. By making the bumper beam of relatively small rods the front view of the car is not obstructed and a light and airy appearance is obtained as contrasted with the heavy massive appearance that is involved with some of the bumpers made out of flat bars that have separated sections. Further, the separated bars 3 and 4 permit the mounting of a license plate on the bars themselves as is indicated at 6 in dotted lines in Figure 1, and this is a decided convenience, particularly as relates to the front end of a car.

I connect the top and bottom bumper rods by a series of vertical members indicated at 7, which are looped over the rods 3 and 4 and secured by rivets 8, in fixed positions on the rods. I may, if I choose, make the middle one of these members 8 of considerable width or length longitudinally of the rods and fasten the license plate directly to this. Thus, if any particular car owner or manufacturer of cars desires to have a massive front appearance for the bumper, he may make this middle plate of considerable width or length along the bar and secure any mass effect that he may desire, or he may otherwise connect the top and bottom rods. The bumper beam composed of a loop as indicated by the rods 3 and 4 may be supplemented by an additional member indicated by 9.

This rod 9 normally would extend across only from the outside members 7 as indicated in Figure 1. The bumper rods or composite beam as described is supported by upper spring members 10 and lower spring members 11, which are secured by clips 12 to the bumper rods. These curved spring members are made out of flat pieces of spring steel and are provided with a series of short bends indicated by 13 to provide a series of seats 14 directly in contact with the car frame. The purpose of the bends 13 is to allow clearance between the seats 14 so that the said seats 14 may rest in stable contact with the curved surface of the ordinary automobile frame member. Holes are provided in the seats 14 for bolts 15 to pass through the spring members and the flanges 16 of the frame.

The fastening for the lower spring member 10 is shown as being made by clip bolts 17 which embrace the frame member instead of the bolts 15 as described. However, either system of fastening to the frame may be used for holding the members.

There is a wide range in shape of the frame ends of the automobiles or cars as they are called, varying in the degree of curvature of the surface 18. It is desirable that the automobile bumper should be supported at about a regular normal height for all the cars and hence some means of securing the bumper to the different types of cars must be provided to permit this adjustment without too many special fittings. By the arrangement of the two spring members 10 and 11 as shown, each specially connected to the frame of the car, and with their seats 14 as described, may be adjusted upward and downward along the curve 18, thus bringing the bumper bars 3 and 4 into the desired position of height from the roadway on a wide range of different shaped ends of frames. This adjustment will be readily understood when it is considered that the fastening of the separate members at the seats 14 may go up and down the inclined surface, both being carried up together, or one up and one down, as may be required to bring the parts 3 and 4 to the positions desired.

With many cars the rear end of the frame is similar to the front end of the frame and thus the adjustment just described and shown in Figure 3 may be applied to the rear end of the car without change.

With some cars, however, it is necessary to add an extension, at the end of the frame of the car, to provide for the mounting of the bumper at the rear, and I have provided for this as shown by the modified frames of Figures 4 and 5, wherein 19 indicates the longitudinal frame member of a car and 20 a channel extension beam that may be secured by bolts 21 to the frame members 19. To this channel member 20 I secure by bolts 22 the spring members 23 which support the rods 3 and 4 that form the bumper beam as previously described.

The spring members 23 are both alike in Figure 4, as this construction does not require such an adjustment as is required on the curved end frame members of Figure 3, since any adjustment of elevation that will be made for the rear bumper, will be taken care of by the channel extension member 20. With certain types of cars this channel extension construction of Figure 4, may be required for the front end of the car as well as for the rear.

With some types of cars I find it desirable to so shape the curved spring members 10 and 11 that their ends are superposed where they fasten to the frame thus saving one set of clip bolts in fastening both spring members to the frame. This type of a bumper last described will be used chiefly on what may be termed factory production orders, rather than accessory orders as commonly understood in the business.

The bumper business to-day is largely on what is termed an accessory business and the supply dealer carries in stock bumpers to be applied to various different cars that may come along and it is desirable that the dealer carry as few parts as possible to meet the widest demand in various makes of cars that can be taken care of with the same construction, and the forms shown in Figures 3 and 4, permit the accessory dealer to carry a small number of special parts and yet get a better bumper connection, adapted to a wider range of cars than any system of which I am aware for fastening the bumper to the car frame.

The use of round rods connected across by vertical members as I have shown and described, gives a bumper having a wide contact face and yet is light in weight, easily cleaned, and permits clearance through the bumper for inspection and access to the car behind it, which is a desideratum.

What I claim is:—

1. In a bumper of the class described, the combination with a bumper body in the form of an elongated loop, of spaced connections between the upper and lower sides of the loop, and flat spring members each fixed at one end to said loop and having its opposite end provided with short spaced seat portions, to rest upon a machine frame member, connected by outwardly curved portions, to spring and allow the seats to fit closely, curved portions of an automobile frame.

2. The combination with a bumper beam having upper and lower horizontal members, of rigid vertical members connecting said horizontal members at intervals, and pairs of flat leaf spring members adapted for connecting the beam to an automobile frame, one spring of each pair curving downwardly and the other curving upwardly from said beam.

3. A bumper beam consisting principally of parallel round rods in a vertical plane, adapted to extend from side to side of a vehicle, and beams supporting spring members embracing and revolubly adjustable about the upper and lower rods, respectively, and adapted to be secured to the frame of a vehicle.

4. The combination with a bumper body consisting principally of spaced round parallel rods normally in a vertical plane and connected by crossbars, of sets of spring body-supporting members, the sets being revolubly adjustable about different rods, respectively, and adapted to connect said body with a vehicle frame.

5. The combination with a horizontal bumper beam, of two pairs of beam-supporting spring members near the beam's ends, respectively, and adapted to seat accurately at any of various points of adjustment along the vertically curved surfaces of ordinary automobile frame members, and means for independently fixing the two spring members to the frame members.

6. In a bumper of the class described, the combination with a bumper beam having a plurality of constituent bars, of beams-supporting spring members curved upwardly from their junction with the beam, and beam-supporting members curved downwardly from the connection with the beam, each of said members being adapted and arranged for independent attachment to an automobile frame.

7. The combination with a bumper beam terminating, when in use, in free ends at some distance beyond the sides of an automobile frame, of pairs of oppositely and vertically curved flat springs, the pairs supporting the end portions respectively, of the beam, and each spring being adapted and arranged for independent attachment to an automobile frame.

8. The combination with a bumper, of spring members for supporting the bumper from the curved portions of an automobile frame, each of said members having distinct seats for fitting different portions of a curved car frame surface itself at a distance from the seats of other members.

9. The combination with a bumper beam body having as parallel upper and lower members round rods of uniform diameter, of resilient members adjustably clamped to said rods at points corresponding to the width of the vehicle frame to which they are to be attached.

10. In an automobile bumper, the combination with an elongated loop having U-shaped ends and provided with a middle member mounted between the sides of the loop, of transverse vertical members connecting said sides and member, and suitable means for fastening the said bars to the frame of the car.

11. In an automobile bumper, the combination with a top horizontal member and a bottom horizontal member connected across by vertical members, of spring supporting members connected to the top horizontal member of the beam, spring supporting members connected to the bottom horizontal member or the beam, and means for suitably fastening the said spring supporting members to the frame of the car.

12. In an automobile bumper, the combination with a bumper beam composed of a plurality of round rods extending horizontally across the front of the car and transverse vertical members connecting the said round rods, of supporting means in spring form for holding the said rods in position on the frame of the car.

13. In a device of the class described, a bumper beam composed of a top member and a bottom member extending horizontally across the car and spring supporting-members connected to the horizontal members by hinged connections which permit variation in the adjustment of the positions of the spring connecting members and horizontal members.

14. The combination with a bumper beam, of flat springs secured to and extending upwardly from the upper side of said beam, and flat springs secured to and extending downwardly from the lower side of said beam, the two sets of oppositely extending springs being bent toward each other at some distance from the beam and all adapted and arranged for independent attachment to the frame of an automobile.

15. The combination with a bumper beam, of resilient beam-supports arranged for angular vertical adjustment with respect to the beam and adapted for relative movement along automobile frame members, and means for fixing the supports to such members after the proper adjustment of the beam has been secured.

Signed at Chicago, in the county of Cook and State of Illinois, this 30th day of September 1921.

WILLIAM ERASTUS WILLIAMS.

Witnesses:
   B. J. BERNHARD,
   F. M. ZOBEL.